(12) United States Patent
Dearth et al.

(10) Patent No.: US 12,511,905 B2
(45) Date of Patent: Dec. 30, 2025

(54) COMPUTER VISION SYSTEMS AND METHODS FOR HAZARD DETECTION FROM DIGITAL IMAGES AND VIDEOS

(71) Applicant: Insurance Services Office, Inc., Jersey City, NJ (US)

(72) Inventors: Jared Dearth, Lehi, UT (US); Matthew David Frei, Lehi, UT (US); Samuel Warren, Salt Lake City, UT (US); Ravi Shankar, Fremont, CA (US); Vahid Meimand, Washington, DC (US)

(73) Assignee: Insurance Services Office, Inc., Jersey City, NJ (US)

( * ) Notice: Subject to any disclaimer, the term of this patent is extended or adjusted under 35 U.S.C. 154(b) by 263 days.

(21) Appl. No.: 18/125,402

(22) Filed: Mar. 23, 2023

(65) Prior Publication Data
US 2023/0306742 A1    Sep. 28, 2023

Related U.S. Application Data

(60) Provisional application No. 63/323,212, filed on Mar. 24, 2022.

(51) Int. Cl.
*G06V 20/50* (2022.01)
*G06V 10/44* (2022.01)
(Continued)

(52) U.S. Cl.
CPC .............. *G06V 20/50* (2022.01); *G06V 10/44* (2022.01); *G06V 10/764* (2022.01);
(Continued)

(58) Field of Classification Search
CPC ...... G06V 20/50; G06V 10/44; G06V 10/764; G06V 10/774; G06V 10/82; G06V 10/778; G06V 20/52; G06Q 40/08
(Continued)

(56) References Cited

U.S. PATENT DOCUMENTS 11,675,878 B1 *   6/2023  Pandya ................... G01S 17/86
                                                  382/103
2017/0352099 A1  12/2017  Howe et al.
(Continued)

OTHER PUBLICATIONS

International Search Report of the International Searching Authority mailed on Jun. 27, 2023, issued in connection with International Application No. PCT/US23/16069 (3 pages).
(Continued)

*Primary Examiner* — Charlotte M Baker
(74) *Attorney, Agent, or Firm* — McCarter & English, LLP

(57) ABSTRACT

Computer vision systems and methods for hazard detection from digital images and videos are provided. The system obtains media content indicative of an asset, preprocesses the media content, and extracts, based at least in part on one or more feature extractors, features from the preprocessed media content. The system determines, based at least in part on one or more classifiers, a value associated with a hazard, which can indicate the likelihood of a media content having the hazard. The system determines that the media content includes the hazard based at least in part on a comparison of the value to a threshold value. The system can generate a visual indication in the image indicative of the hazard.

14 Claims, 16 Drawing Sheets

(51) Int. Cl.
    *G06V 10/764*     (2022.01)
    *G06V 10/774*     (2022.01)
    *G06V 10/82*     (2022.01)
    *G06Q 40/08*     (2012.01)

(52) U.S. Cl.
    CPC ............ *G06V 10/774* (2022.01); *G06V 10/82* (2022.01); *G06Q 40/08* (2013.01)

(58) Field of Classification Search
    USPC ........................................................ 382/103
    See application file for complete search history.

(56) References Cited

U.S. PATENT DOCUMENTS

| | | | |
|---|---|---|---|
| 2020/0126210 A1* | 4/2020 | Li | G06F 16/532 |
| 2020/0279367 A1 | 9/2020 | White | |
| 2021/0279811 A1 | 9/2021 | Waltman et al. | |
| 2022/0058591 A1 | 2/2022 | Xiong et al. | |
| 2024/0020969 A1* | 1/2024 | Schenkel | G06T 7/001 |

OTHER PUBLICATIONS

Written Opinion of the International Searching Authority mailed on Jun. 27, 2023, issued in connection with International Application No. PCT/US23/16069 (4 pages).

Extended European Search Report issued by the European Patent Office dated Oct. 27, 2025, issued in 1 connection with European Patent Application No. 23775659.8 (6 pages).

\* cited by examiner

FIG. 12 (Cont.)

File Details

△ Hazard Recognition
Possible Yard/Premises Hazard
Yard Debris
Trip/Fall Hazard
Possible Roof Damage Hazard
Damaged roof
Impact marks
Missing shingles
Tarp present
Possible Tree Hazard
Overhanging/touching tree △ Metadata △ Location Date Discrepancy

Posted By
(WW) KoplinJenkins 2/21/20, 11:24
Upload Description Comment
0 / 90

Already Shared With:
(WW) KoplinJenkins 2/21/20, 11:24

Hazards incorrect or missing?
Tell us what hazard is incorrect or missing to help us improve your experience.
☑ Yard/Premises Hazards
  ☑ Yard Debris
  ☑ Trip/Fail
☐ Roof Damage Hazards
  ☐ Damage roof
  ☐ Impact marks
  ☐ Missing shingles
☐ Tree Hazard
  ☐ Missing shingless
☐ Missing Hazard There is no yard/premises hazard in the photo.

[Submit]

COMPUTER VISION SYSTEMS AND METHODS FOR HAZARD DETECTION FROM DIGITAL IMAGES AND VIDEOS

RELATED APPLICATIONS

This application claims priority to U.S. Provisional Patent Application Ser. No. 63/323,212 filed on Mar. 24, 2022, the entire disclosure of which is hereby expressly incorporated by reference.

TECHNICAL FIELD

The present disclosure relates generally to the field of computer vision. More specifically, the present disclosure relates to computer vision systems and methods for hazard detection from digital images and videos.

RELATED ART

Conventionally, performing insurance-related actions such as insurance policy adjustments, insurance quote calculations, underwriting, inspections, claiming process and/or property appraisal involves an arduous and time-consuming manual process that requires human intervention. For example, a human operator (e.g., a property inspector) often must physically go to a property site to inspect the property for hazards and risk assessments and must manually determine types of hazards. Such process is cumbersome and can place the human operator in dangerous situations, when the human operator approaches an area (e.g., a damaged roof, an unfenced pool, dead trees, or the like). In some situations, the human operator may not be able to capture all of the hazards accurately and thoroughly, or properly recognize types of the hazards, which may result in inaccurate assessment and human bias errors.

Thus, what would be desirable are computer vision systems and methods for hazard detection from digital images and videos which address the foregoing, and other, needs.

SUMMARY

The present disclosure relates to computer vision systems and methods for hazard detection from digital images and videos. The system obtains media content (e.g., a digital image, a video, video frame, or other type of content) indicative of an asset (e.g., a real estate property). The system preprocesses the media content (e.g., compressing/down sampling, changing the size, changing the resolution, adjusting display settings, changing a perspective, adding one or more filters, adding and/or removing noise, spatially cropping and/or flipping, spatially transforming, up sampling, and/or changing the data point density). The system extracts, based at least in part on one or more feature extractors (e.g., multiple convolutional layers of a computer vision model), features (e.g., roof/pool/yard/exterior structures or other features) from the preprocessed media content. These features are learnt during the training phase at each layer, for example, the initial network layers learn very basic shapes such as edges and corners and each successive layers learn using a combination of previous layers to identify more complex shapes and colors. The system determines, based at least in part on one or more classifiers (e.g., fully connected layers of the computer vision model), a value (e.g., a probability value, a confidence value, or the like) associated with a hazard. Examples of hazards the system is capable of detecting include roof damage, missing roof shingles, roof tarps, an unfenced pool, a pool slide, a pool diving board, yard debris, tree touching structure, a dead tree, exterior wall damage, porch/patio/deck/stairs damage, porch/patio/deck/stairs missing railing(s), door/window boarded up, door/window damage, flammables or combustible gases or liquids, fuse electrical panels, soffit/fascia/eave damage, wood burning stoves, fence damage, interior wall damage, interior water damage, or other types of hazards. The value can indicate the likelihood of a media content having the hazard. The system determines that the media content includes the hazard based at least in part on a comparison of the value to a threshold value. Each of the hazards identifiable by the system will have an pre-calculated threshold value. The system can generate a visual indication (e.g., colored contour, or the like) of the area in the image indicative of the hazard.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to computer vision systems and methods for hazard detection from digital images and videos, as described in detail below in connection with FIGS. 1-14.

Figure 1:
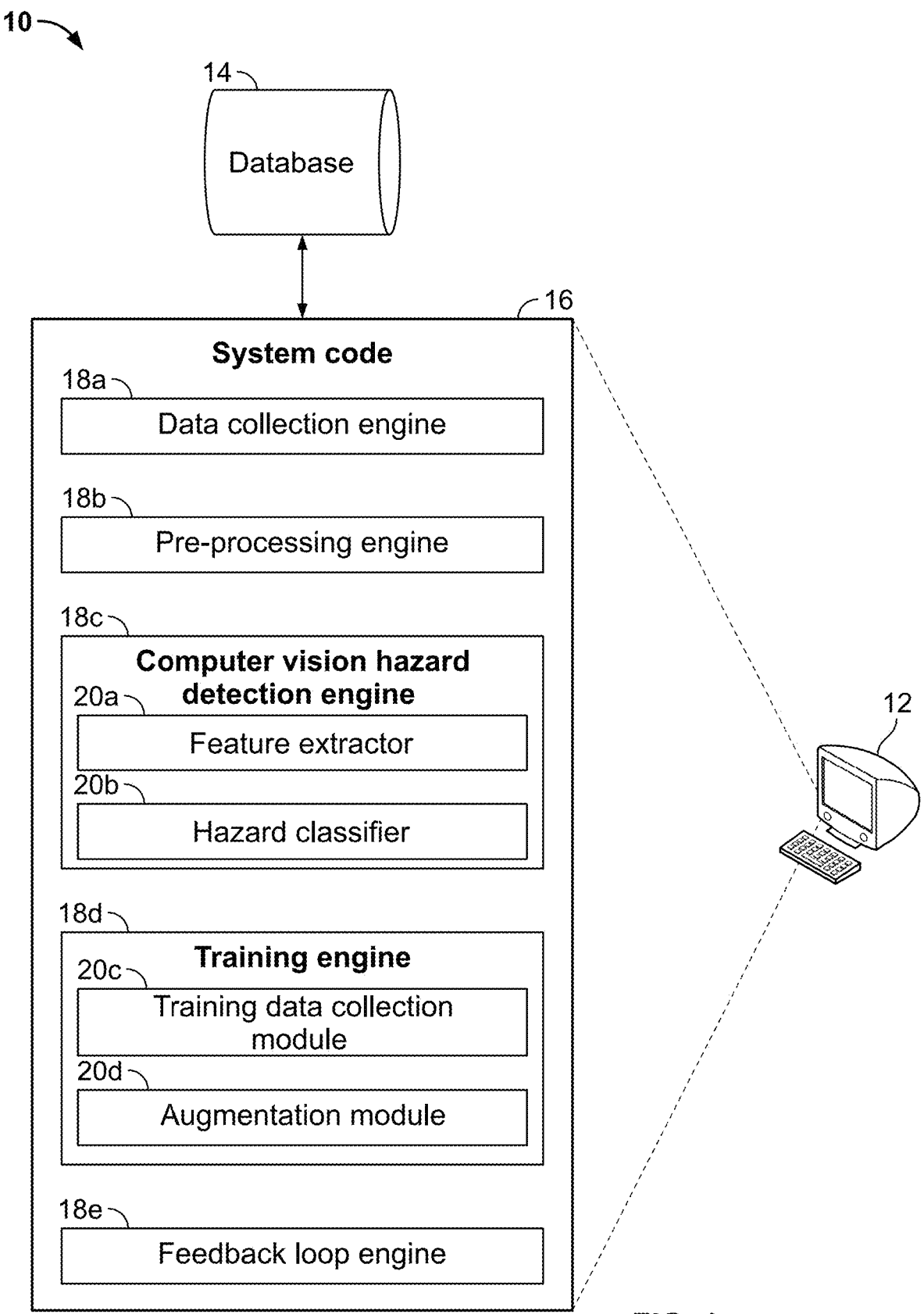
FIG. 1 is a diagram illustrating an embodiment of the system of the present disclosure.

Turning to the drawings, FIG. 1 is a diagram illustrating an embodiment of the system 10 of the present disclosure. The system 10 can be embodied as a central processing unit 12 (processor) in communication with a database 14. The processor 12 can include, but is not limited to, a computer system, a server, a personal computer, a cloud computing device, a smart phone, or any other suitable device programmed to carry out the processes disclosed herein. The system 10 can retrieve data from the database 14 associated with an asset.

An asset can be a resource insured and/or owned by a person or a company. Examples of an asset can include residential properties such as a home, a house, a condo, an apartment, commercial properties such as a company site, a commercial building, a retail store, land etc.), or any other suitable properties or area which requires assessment. An asset can have structural or other features including, but not limited to, an exterior wall structure, a roof structure, an outdoor structure, a garage door, a fence structure, a window structure, a deck structure, a pool structure, yard debris, tree touching structure, plants, or any suitable items of the asset.

The database 14 can include various types of data including, but not limited to, media content indicative of an asset as described below, one or more outputs from various components of the system 10 (e.g., outputs from a data collection engine 18a, a pre-processing engine 18b, a computer vision hazard detection engine 18c, a feature extractor 20a, a hazard classifier 20b, a training engine 18d, a training data collection module 20c, an augmentation module 20d, a feedback loop engine 18e, and/or other components of the system 10), one or more untrained and trained computer vision models, and associated training data, one or more untrained and trained feature extractors and hazard classifiers, and associated training data, and one or more training data collection models. It is noted that the feature extractor 20a and the hazard classifier 20b need not be separate components/models, and that they could be a single model that can learn discriminative features of a hazard via learning techniques and can identify such hazards from media content. The system 10 includes system code 16 (non-transitory, computer-readable instructions) stored on a computer-readable medium and executable by the hardware processor 12 or one or more computer systems. The system code 16 can include various custom-written software modules that carry out the steps/processes discussed herein, and can include, but is not limited to, the data collection engine 18a, the pre-processing engine 18b, the hazard detection engine 18c, the feature extractor 20a, the hazard classifier 20b, the training engine 18d, the training data collection module 20c, the augmentation module 20d, and the feedback loop engine 18e. The system code 16 can be programmed using any suitable programming languages including, but not limited to, C, C++, C#, Java, Python, or any other suitable language. Additionally, the system code 16 can be distributed across multiple computer systems in communication with each other over a communications network, and/or stored and executed on a cloud computing platform and remotely accessed by a computer system in communication with the cloud platform. The system code 16 can communicate with the database 14, which can be stored on the same computer system as the code 16, or on one or more other computer systems in communication with the code 16.

The media content can include digital images, digital videos, digital video frames, and/or digital image/video datasets including ground images, aerial images, satellite images, etc. where the digital images and/or digital image datasets could include, but are not limited to, images of the asset. Additionally and/or alternatively, the media content can include videos of the asset, and/or frames of videos of asset. The media content can also include one or more three dimensional (3D) representations of the asset (including interior and exterior structure items), such as point clouds, light detection and ranging (LiDAR) files, etc., and the system 10 could retrieve such 3D representations from the database 14 and operate with these 3D representations. Additionally, the system 10 could generate 3D representations of the asset, such as point clouds, LiDAR files, etc. based on the digital images and/or digital image datasets. As such, by the terms "imagery" and "image" as used herein, it is meant not only 3D imagery and computer-generated imagery, including, but not limited to, LiDAR, point clouds, 3D images, etc., but also optical imagery (including aerial and satellite imagery).

Still further, the system 10 can be embodied as a customized hardware component such as a field-programmable gate array ("FPGA"), an application-specific integrated circuit ("ASIC"), embedded system, or other customized hardware components without departing from the spirit or scope of the present disclosure. It should be understood that FIG. 1 is only one potential configuration, and the system 10 of the present disclosure can be implemented using a number of different configurations.

Figure 2:
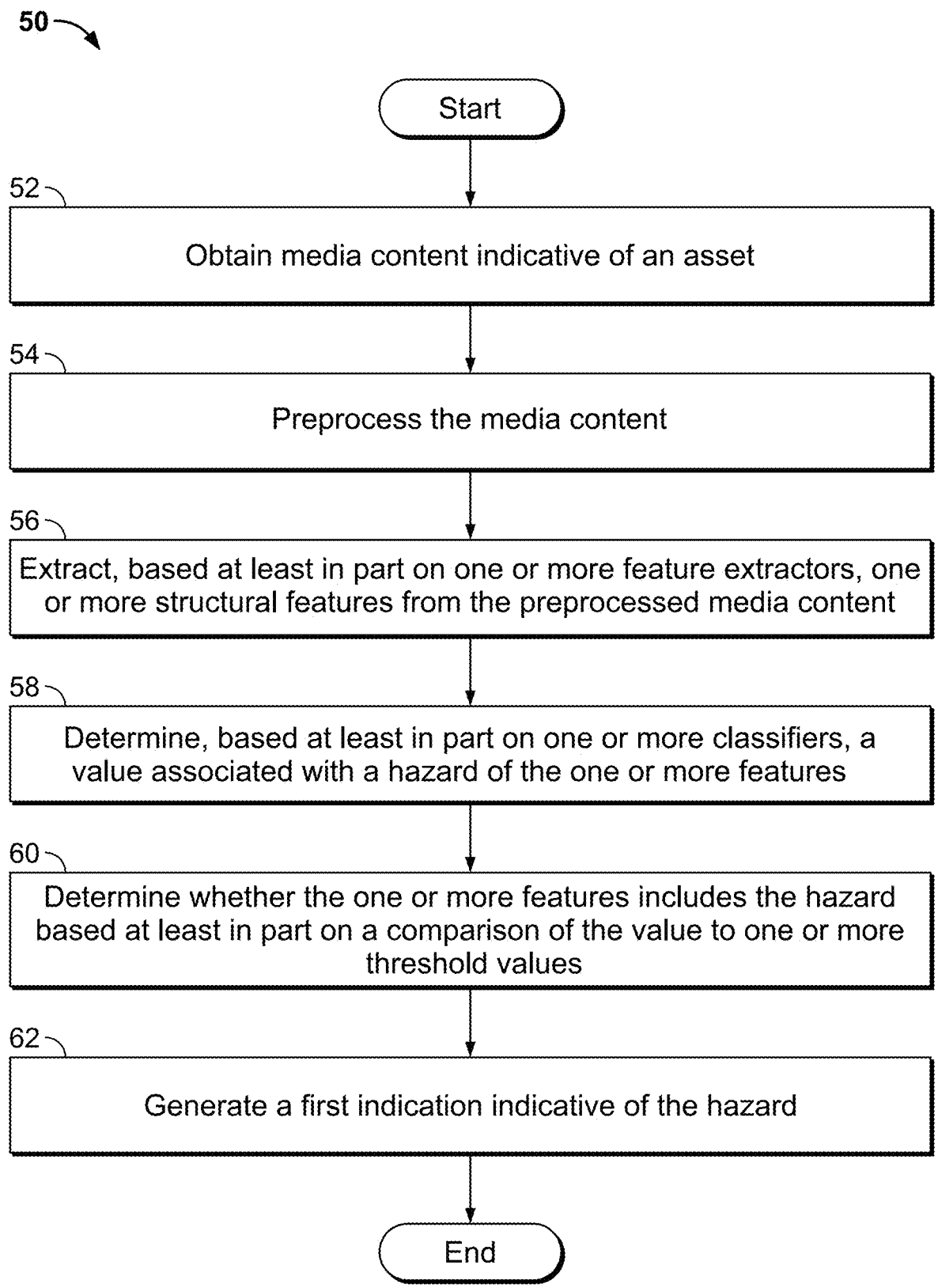
FIG. 2 is a flowchart illustrating overall processing steps carried out by the system of the present disclosure.

FIG. 2 is a flowchart illustrating overall processing steps 50 carried out by the system 10 of the present disclosure. Beginning in step 52, the system 10 obtains media content indicative of an asset. As mentioned above, the media content can include imagery data and/or video data of an asset, such as an image of the asset, a video of the asset, a 3D representation of the asset, or the like. The system 10 can obtain the media content from the database 14. Additionally and/or alternatively, the system 10 can instruct an image capture device (e.g., a digital camera, a video camera, a LiDAR device, an unmanned aerial vehicle (UAV) or the like) to capture a digital image, a video, or a 3D representation of the asset. In some embodiments, the system 10 can include the image capture device. Alternatively, the system 10 can communicate with a remote image capture device. It should be understood that the system 10 can perform the aforementioned task of obtaining the media content via the data collection engine 18a.

In step 54, the system 10 preprocesses the media content. For example, the system 10 can perform specific preprocessing steps including, but not limited to, one or more of: compressing the media content in such a way that it consumes less space than the original media content (e.g., image compression, down sampling, or the like), changing the size of the media content, changing the resolution of the media content, adjusting display settings (e.g., contrast, brightness, or the like), changing a perspective in the media content (e.g., changing a depth and/or spatial relationship between objects in the media content, shifting the perspective), adding one or more filters (e.g., blur filters, and/or any image processing filters) to the media content, adding and/or removing noise to the media content, spatially cropping and/or flipping the media content, spatially transforming (e.g., rotating, translating, scaling, etc.) the media content, up sampling the media content to increase a number of data points (e.g., pixels, cloud data points, or the like), changing the data point density of the media content, or some combinations thereof. It should be understood that the system 10 can perform one or more of the aforementioned preprocessing steps, or other suitable steps, in any particular order via the pre-processing engine 18b. It is additionally noted that the pre-processing steps discussed herein might not be carried out each time the system is being used (e.g., in instances where the model has already been trained).

In step 56, the system 10 extracts, based at least in part on one or more feature extractors, one or more features (for example, recognizes specific patterns and colors or the like) from the preprocessed media content. A feature extractor can identify one or more features in the media content. The feature extractor can be part of a computer vision model that can be configured to perform feature detections for an asset. For example, a feature extractor of a computer vision model can include multiple layers (e.g., convolutional layers) to identify one or more features in the media content. A computer vision model contains multiple filters each of which learns specific abstract pattern or feature from raw image pixels. It should be noted that there are no special instructions for the model as to what features it should learn, but rather the model learns based on the data it is provided. The network learns new and increasingly complex features and uses them in the classification layers to make a classification or prediction. The computer vision model can include a region with CNN (e.g., Resnet, efficient net, Transformer, or other type of network) based computer vision model, a fully convolutional network (FCN) based computer vision model, a weakly supervised based computer vision model, an AlexNet based computer vision model, a VGG-16 based computer vision model, a Google-Net based computer vision model, a ResNet based computer vision model, a Transformer based computer vision model such as ViT, a supervised machine learning based computer vision model, a semi-supervised computer vision model, or some combination thereof. Additionally, and/or alternatively, the computer vision model can used attention modules such as but not limited to self-attention, which increases the receptive field of the computer vision models without adding a lot of computation cost and helps in making the final classifications. Additionally, and/or alternatively, the feature extractor can include one or more neural networks including, but not limited to, a convolutional neural network (CNN), or any suitable neural network. The feature extraction can also be part of an object detection framework (such as R-CNN, Fast R-CNN, Faster R-CNN, YOLO), or semantic segmentation frameworks (such as FCN, U-net, Mask R-CNN) trained to not only find the existence of a hazard but also localize it within the image boundaries.

In step 58, the system 10 determines, based at least in part on one or more classifiers, a value associated with a hazard. A classifier can identify one or more hazards using features from the computer vision architecture. Examples of a hazard can include a roof damage, a roof missing shingle, a roof trap, an unfenced pool, a pool slide, a pool diving board, yard debris, tree touching structure, a dead tree, exterior wall damage, porch/patio/deck/stairs damage, porch/patio/deck/stairs missing railing(s), door/window boarded up, door/window damage, flammables or combustible gases or liquids, fuse electrical panels, soffit/fascia/eave damage, wood burning stoves, fence damage, interior wall damage, interior water damage, or other types of hazards. The classifier includes, but is not limited to, fully connected layers having multiple nodes/heads. Each output (or the final) node/head can represent a presence or an absence of a hazard. In some embodiments, the one or more classifiers can be part of the computer vision model, as described above. In some embodiments, the one computer vision models can be sourced from a pre-trained model available and can be fine-tuned for the specific task of identifying hazards. Using the pre-trained models along with custom classifiers or classification layers help in reducing the training complexity and time for the task. For example, an output of the feature extractor is an input to the classifier or object detector of the same computer vision model. In some embodiments, the classifier can be a machine/deep-learning-based classifier. The classifier can be a binary classifier, a multi-class classifier, or some combination thereof. Additionally, as noted above, the feature extractor can include one or more neural networks including, but not limited to, a convolutional neural network (CNN), a Transformer based network, or any suitable neural network or process or model. Further, as noted above, the feature extraction can also be part of an object detection framework (such as R-CNN, Fast R-CNN, Faster R-CNN, YOLO), or semantic segmentation frameworks (such as FCN, U-net, Mask R-CNN) trained to not only find the existence of a hazard but also localize it within the image boundaries. In some examples, the classifier can include a single classifier to identify one or more hazards. In another examples, the classifier can include multiple classifiers. Each of the sub-classifiers can identify a particular hazard. Each method has its own advantages and disadvantages and is chosen carefully based on the task.

The classifier can generate a value (e.g., a probability value, a confidence value, or the like) associated with a particular hazard. In some cases, the probability value could also be provided with coordinates or boundary boxes to find the object in the media content (e.g., x, y, w, and h coordinates) and in another the probability value could also be provided with segmentation masks to find the region in the images containing the object (e.g. (x1, y2, x2, y2 . . . ). The probability value can indicate how likely the media content includes the particular hazard. For example, an image when passed through the model generates a probability value which can have pool can be associated more with a set of hazards (e.g., an unfenced pool, a pool slide, a pool diving board,) than another set of hazards (e.g., yard debris, or a roof damage) indicating that the pool is more likely to have been detected in the image. It should be noted that the model will still output one probability value for each of the hazards on which it was trained. On comparison with the pre-calculated threshold values, the computer vision model can further narrow down the likelihood using threshold values, as described below.

In step 60, the system 10 determines whether the one or more hazards are present in an image or a video frame based at least in part on a comparison of the value to one or more threshold values. The one or more threshold values can define one or more cutoff values indicative a particular hazard, and/or each hazard will have a single threshold value associated with it, which can be found by running simulations that maximize the score (e.g., for improving accuracy or precision or recall or F-1 or the like). For example, continuing the above example, for a situation having a single threshold value indicative of media content containing a particular hazard (e.g., an unfenced pool, a pool slide, a pool diving board), if the computer vision model (e.g., the classifier as described above) determines that the value exceeds (e.g., is equal to or is greater than) the single threshold value, the computer vision model can determine that the particular hazard (e.g., an unfenced pool) is present. If the value is less than the single threshold value, the computer vision model can determine that the media content most likely does not have the particular hazard (e.g., an unfenced pool). For a situation having, when multi-node classifier is used, it generates more than one threshold values (e.g., a first threshold value indicative of the first hazard, and a second threshold value indicative of the second hazard, and so forth), if the first probability value exceeds a first threshold value, the computer vision model can determine that the media content most likely has the first hazard. If the second probability value is less than the second threshold, the computer vision model can determine that the media content does not contain the second hazard, and so forth. It is further noted that, after processing an image, the system can detect more than one hazard in each media content. In the case of multiple thresholds, each hazard will have a threshold and the value produced by the system can be compared to the threshold for the given hazard. Thereafter, a decision is made as to whether the hazard exists. The system is designed so that the threshold values can be independent of one another (for different hazards, e.g., an unfenced pool and a pool slide). Further, it is noted that one image can have more than one hazard present in it, such that each of the probability values for each of the hazards can exceed the threshold value for each of the hazards.

Additionally and/or alternatively, for each media content, the system 10 can identify more than one hazard. For example, continuing the above example, the computer vision model can generate an additional values associated with a different hazards (e.g., a pool slide, a pool diving board, or no depth mark), and can determine whether a different hazard based is present on a comparison with the threshold value assigned to each hazard, as described above. It should be also understood that the system 10 can perform the aforementioned task via the feature detector 20a and/or the hazard classifier 20b. The one or more threshold values can be determined after training steps, as described with respect to FIG. 6. It should be noted that the pre-calculated threshold values can be changed but can affect the performance of the model.

In step 60, the system 10 generates an indication indicative of the hazard. In some examples, the system can generate a textual description associated with the detected hazard, including, but not limited to: the name of the hazard, the location of the hazard, or any other suitable description about the hazard. Further, other types of user interface components (e.g., GUI components, or colored contours or the like) can be generated and displayed by the system to indicate the hazard.

Figure 3:
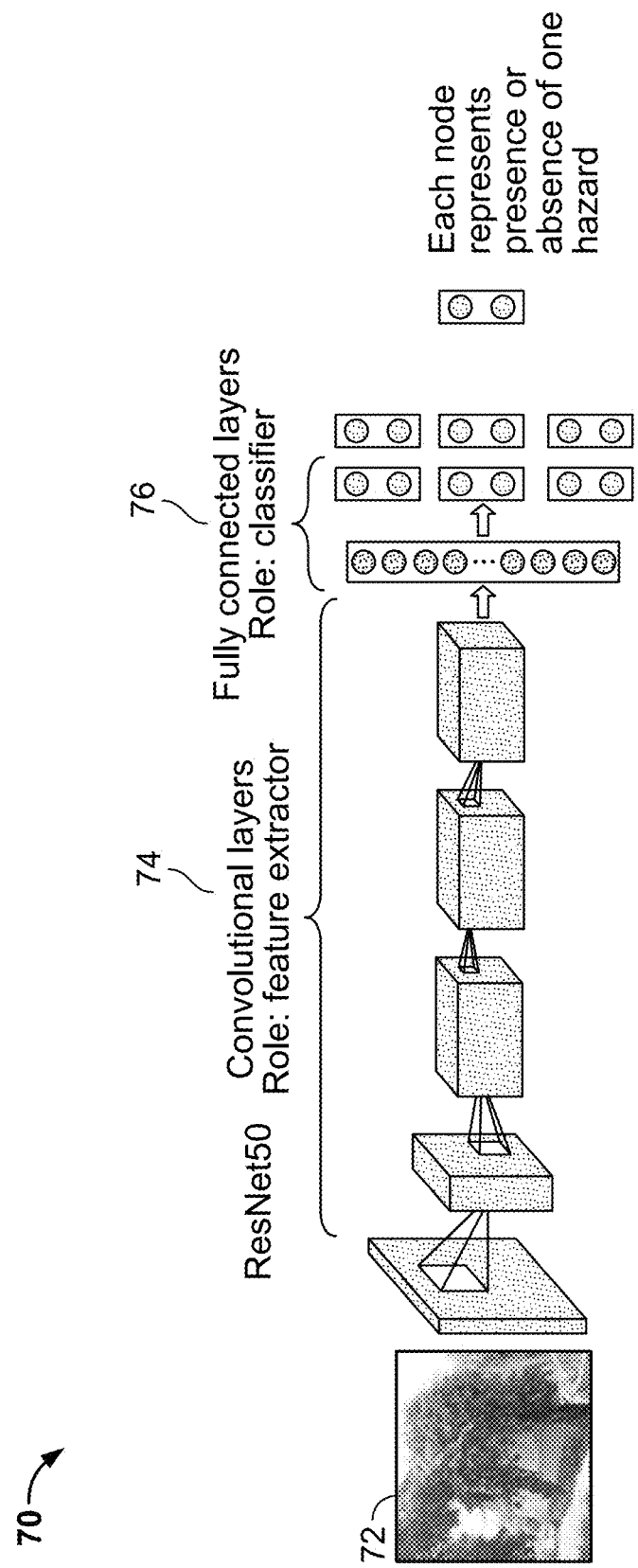
FIG. 3 is a diagram illustrating an example of hazard detection processes performed by the system of the present disclosure.

FIG. 3 is a diagram illustrating an example computer vision model 70 of hazard detection present herein. The computer vision model 70 (e.g., a ResNet 50 computer vision model) can be one of embodiments of the above described of the computer vision model of the computer vision hazard detection engine 18c in FIG. 1. The computer vision model 70 includes a feature extractor 74 (e.g., one of embodiments of the feature extractor 20a in FIG. 1) and a classifier 76 (e.g., one of embodiments of the hazard classifier 20b in FIG. 1). The feature extractor 74 includes multiple convolutional layers. The classifier 76 includes fully connected layers having multiple nodes/heads. Each node/head can represent a presence or an absence of a hazard. An image 72 showing a house and trees surrounding the house is an input of the computer vision model 70. The feature extractor 74 extracts features (the features discussed above) from the image 72 via the convolutional layers. The extracted features are inputs to the classifier 76 and are processed via the it and then a decision is made at the nodes of the classifier 76. The classifier 76 outputs one or more hazards (e.g., tree touching structure) that are most likely to be present. The ResNet or Efficientnet base architectures can be utilized to extract features, wherein the classifier heads/layers can be customized. Moreover, more recent architecture such as Vision Transformers can be utilized as well, but not limited to these. The weights of the entire network (including the base CNN) can be trained with training data. In the training process, the computer vision model is run through many images and a loss is calculated after each batch of images. The loss (which is optimized when training weights) is then used to run a backpropagation step to modify each of weights in the model so that the error can be minimized. so The network could be trained for multiple hazards simultaneously, and the loss function allows for the model to be trained efficiently. The model processes the images multiple times, also known as epochs, the model maximizes accuracy by minimizing the loss function as defined for any particular task.

Figure 4:
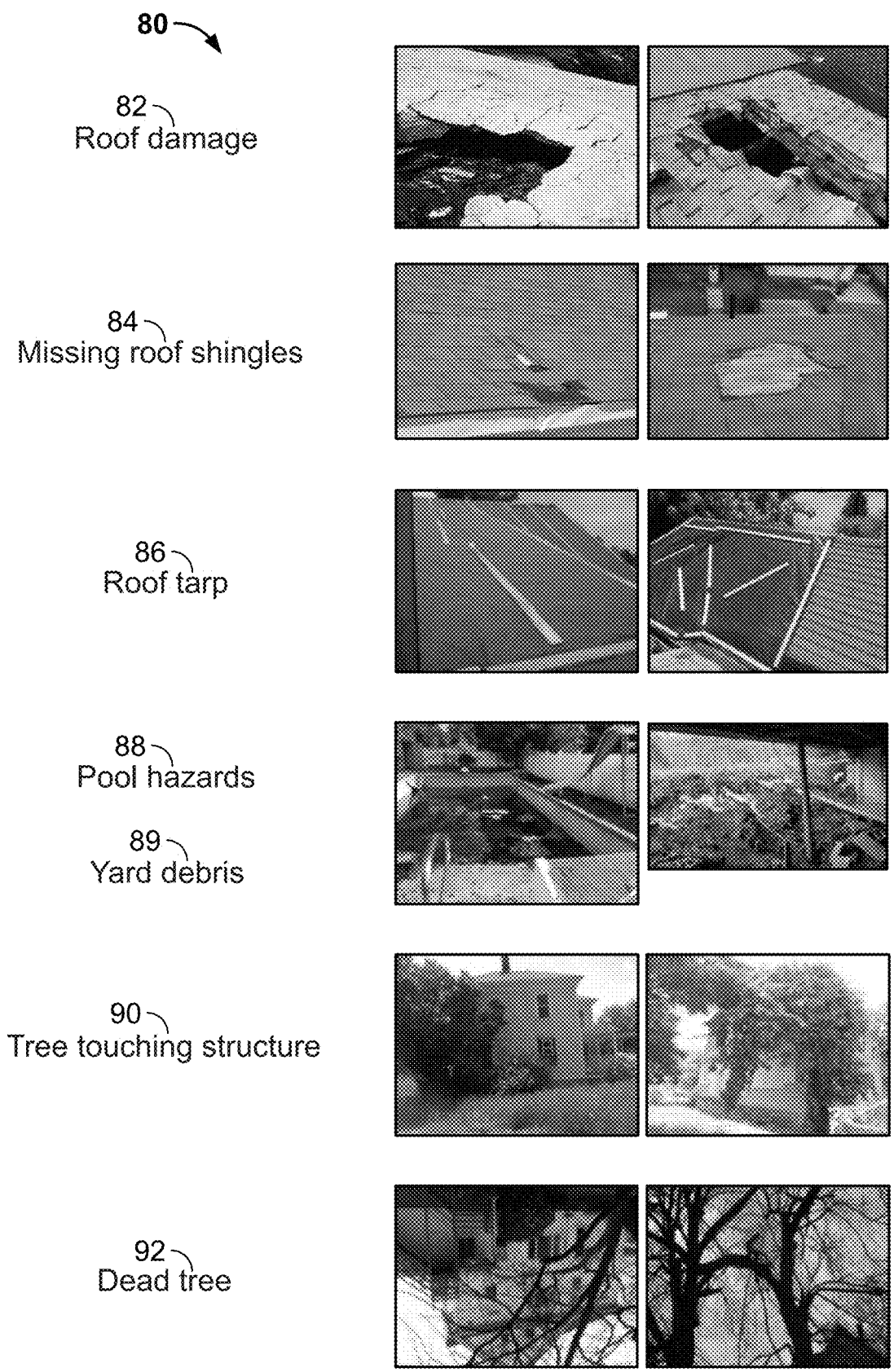
FIG. 4 is a diagram illustrating example hazards capable of being detected by the system of the present disclosure.

FIG. 4 is a diagram illustrating example hazards 80 associated with an asset present herein. The example hazards include a roof damage 82, missing roof shingles 84, a roof tarp 86 that covers the roof, pool hazards 88 including an unfenced pool, a pool slide, a pool diving board, yard debris 89, a tree touching structure 90 (e.g., an exterior structure of an asset covered by a tree), and a dead tree 92 (e.g., a dead tree surrounding an asset).

Figure 5:
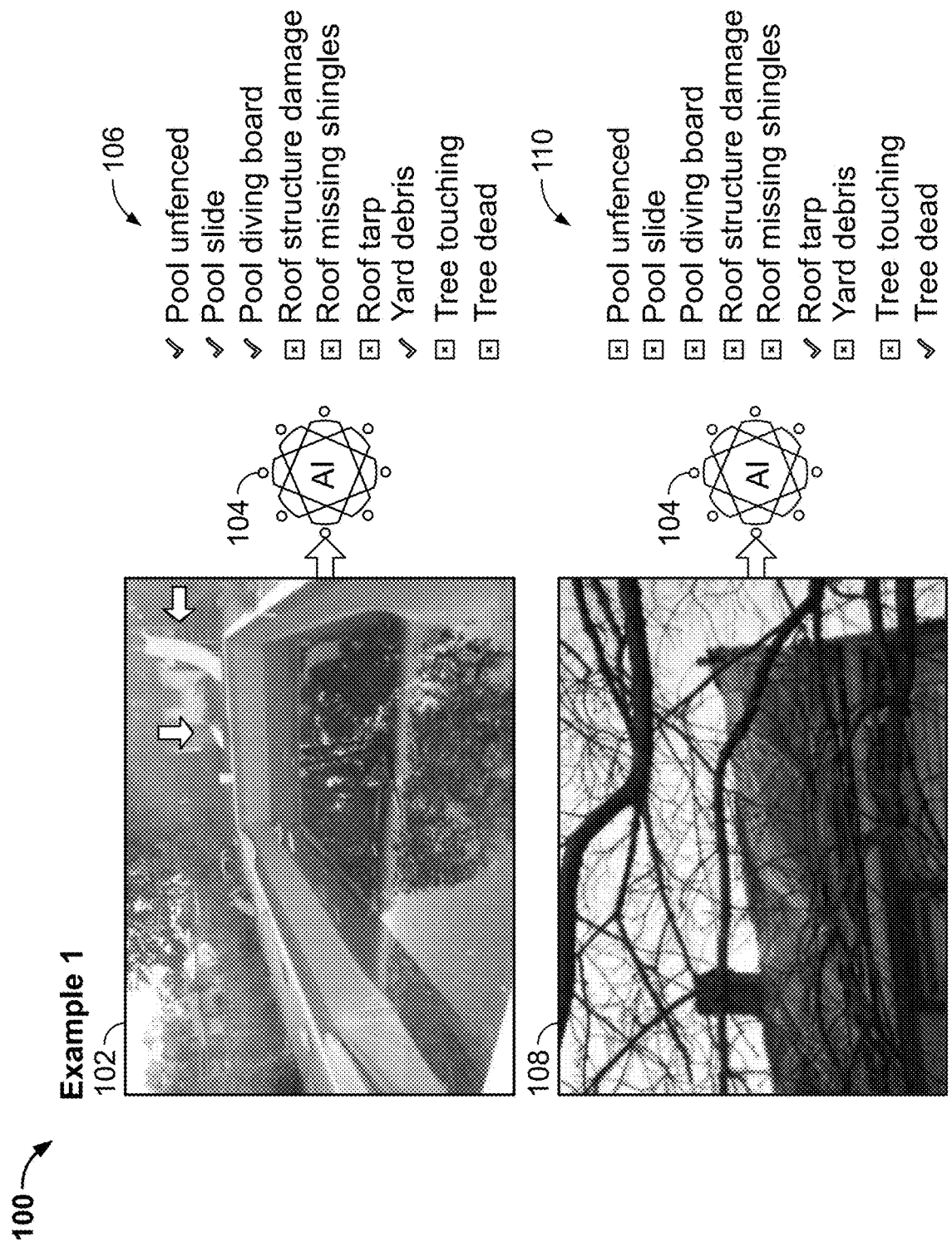
FIG. 5 is a diagram illustrating example outputs of hazard detection performed by the system of the present disclosure.

FIG. 5 is a diagram illustrating example 100 showing outputs of hazard detection performed by the system presented herein. An image 102 of a pool is input into an artificial intelligence (AI) model 104 (e.g., one of embodiments of the above-described computer vision model). The AI model 104 detects one or more hazards associated with the image 102, and outputs the one or more detected hazards 106. As shown in FIG. 5, the AI model 104 selects the one or more detected hazards (e.g., pool unfenced, pool slide, pool diving board and yard debris) from a hazard list and graphically depicts the detected hazards by placing check marks (or, other indicia) in front of the detected hazards 106. In another example, an image 108 of a roof is input into the AI model 104, and the AI model 104 determines that the image 108 contains a roof tarp hazard and a dead tree hazard. The AI model 104 generates a first indication (e.g., a first check mark) of the roof tarp and a second indication (e.g., a second check mark) of the dead tree and places the first and second indications in front of the corresponding hazards 110 in the hazard list. Of course, other types of indications could be provided (e.g., using various GUI elements to indicate the hazards).

Figure 6:
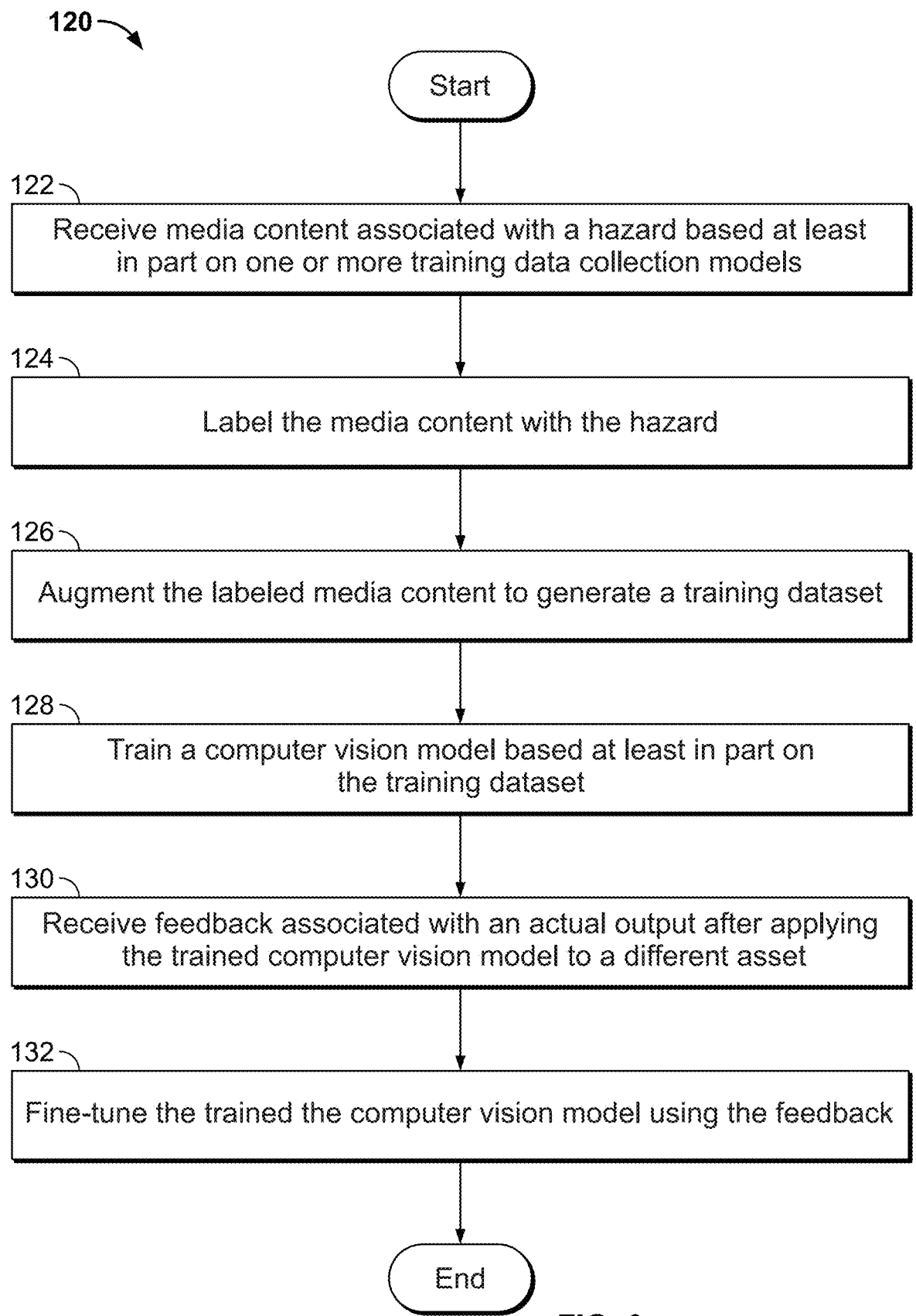
FIG. 6 is a diagram illustrating training steps carried out by the system presented herein.

FIG. 6 is a diagram illustrating training steps 120 carried out by the system 10 of the present disclosure. Beginning in step 122, the system 10 receives media content (e.g., one or more images/videos, a collection of images/videos, or the like) associated with a hazard based at least in part on one or more training data collection models. A training data collection model can determine media content that are most likely to include or that include a particular hazard. Example of a training data collection model can include a text-based search model, a neural network model (e.g., a contrastive language-image pre-training (CLIP) model described in FIG. 8 and FIG. 9), a contrastive learning based model (e.g., a simple framework for contrastive learning of visual representations—SimCLR model described in FIG. 10), or some combination thereof. The images can also be generated using more sophisticated algorithms such as GANs and synthetically generated. A human labeler could provide a final confirmation of labels that will be used for training of the system. It should be understood that the system 10 can perform one or more of the aforementioned preprocessing steps in any particular order via the training data collection module 20c. It is further noted that that CLIP and SimCLR models described herein are merely examples of models that could be utilized in connection with the systems and methods of the present disclosure, and that any other suitable contrastive-learning and neural network-based models can be utilized to identify images based on how well they match a text description or set of search images.

In step 124, the system 10 labels the media content with the hazard. For example, the system 10 can generate an indication indicative of the hazard associated with each image of the media content. In some examples, the system 10 can present the indication directly on the media content or adjacent to the media content. It should be understood that the system 10 can perform one or more of the aforementioned processing steps in any particular order via the training data collection module 20*c*.

In step 126, the system 10 augments the labeled media content to generate a training dataset. For example, the system 10 can perform one or more processing steps including, but not limited to, one or more of: compressing the media content in such a way that it consumes less space than the original media content (e.g., image compression, down sampling, or the like), changing the size of the media content, changing the resolution of the media content, adjusting display settings (e.g., contrast, brightness, or the like), changing a perspective in the media content (e.g., changing a depth and/or spatial relationship between objects in the media content, shifting the perspective), adding one or more filters (e.g., blur filters, and/or any image processing filters) to the media content, adding and/or removing noise to the media content, spatially cropping and/or flipping the media content, spatially transforming (e.g., rotating, translating, scaling, etc.) the media content, up sampling the media content to increase a number of data points, changing the data point density of the media content, or some combinations thereof. The system 10 can combine the augmented media content and the original media content to generate the training data. The training data can include, for some algorithms mentioned before, a positive training dataset and/or a negative training dataset. In other embodiments, only images with labels and coordinates are needed. The positive training data can include labeled media content having a particular hazard. The negative training data can include media content that do not include the particular hazard. The augmentations can happen during the training phase and the augmented images might not be generated before the training step begins. It should be understood that the system 10 can perform one or more of the aforementioned processing steps in any particular order via the augmentation module 20*d*.

In step 128, the system 10 trains a computer vision model (e.g., the computer vision model as described in FIGS. 2 and 3) based at least in part on the training dataset. For example, the system 10 can adjust one or more setting parameters (e.g., weights, or the like) of one or more feature extractors and one or more classifiers of the computer vision model using the training dataset to minimize an error between a generated output and an expected output of the computer vision model. It is also possible to perform training without an expected output, utilizing loss functions built for the purpose of unsupervised learning. In some examples, during the training process, the system 10 can generate one or more values (e.g., a single threshold value, boundary boxes, mask coordinates, or the like) for a hazard to be identified.

In step 130, the system 10 receives feedback associated with an actual output after applying the trained computer vision model to a different asset or different media content. For example, a user can provide a feedback if there is any discrepancy in the predictions.

In step 132, the system 10 fine-tunes the trained computer vision model using the feedback. For instance, data associated with the feedback can be used to adjust setting parameters of the computer vision model and can be added to the training dataset to increase an accuracy of predicted results. In some examples, a prediction was made that the image contains "missing shingles" hazard. The feedback system indicates that the image actually has a "roof damage" hazard and that "missing shingles" was identified incorrectly. The system 10 can adjust (e.g., decreasing or increasing) the weights of the computer vision model so that correct predictions are made on these images without making incorrect observations on the previously collected images. It should be understood that the system 10 can perform the aforementioned task of training steps via the training engine 18*d*, the training data collection module 20*c*, and the augmentation module 20*d*, and the system 10 can perform the aforementioned task of feedback via the feedback loop engine 18*e*.

Figure 7:
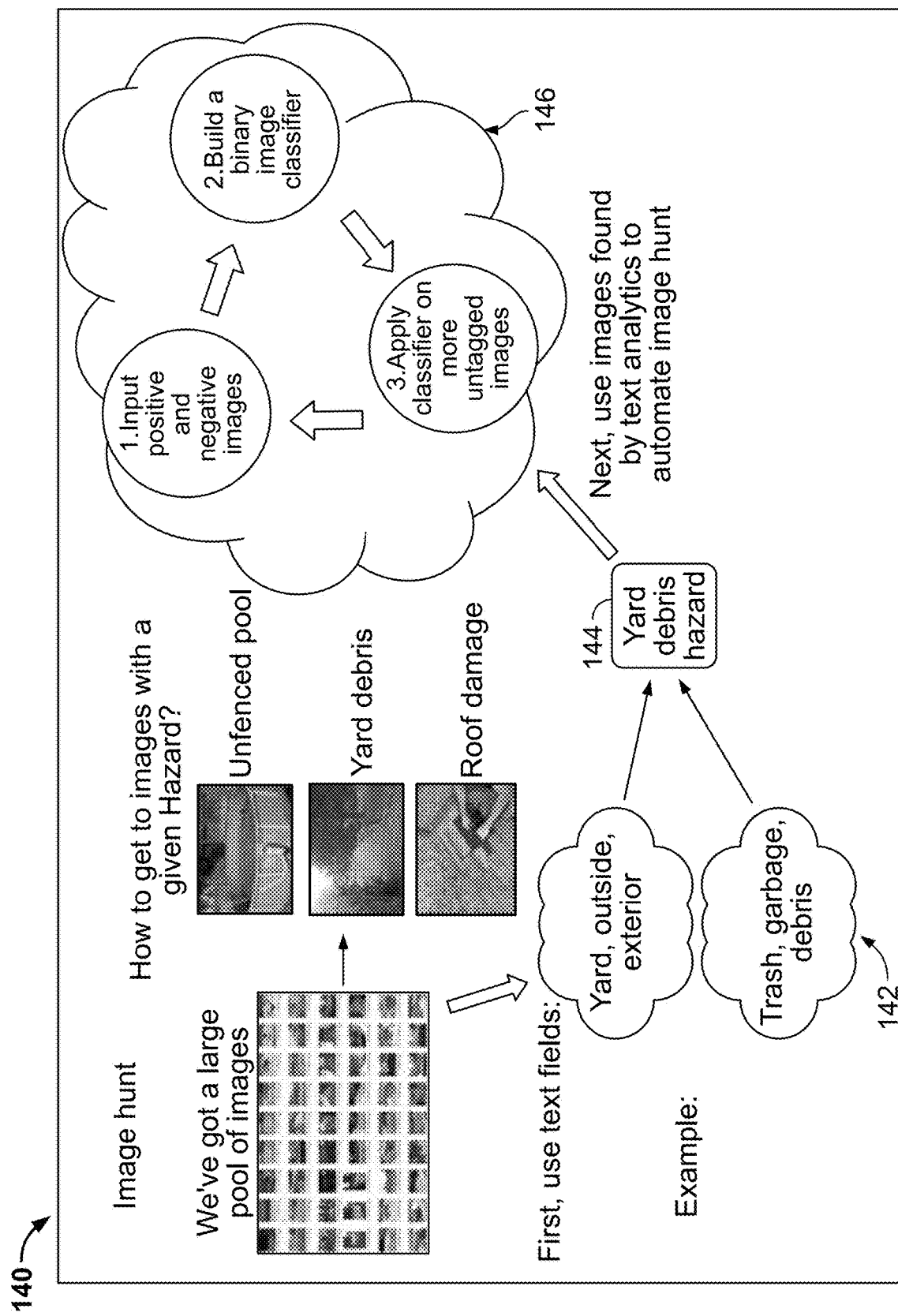
FIG. 7 is a diagram illustrating an example training dataset generated by the system of the present disclosure.

FIG. 7 is a diagram illustrating an example training dataset 140 generated by the system presented herein. An image classifier can be trained and used to select images having a specific hazard. Another method could be using text-based search to select images with a specific hazard. For example, a user can input one or more keywords 142 (e.g., yard, outside, exterior, trash, garbage, debris, or the like). In some examples, as illustrated processing steps 146 in FIG. 7, the binary image classifier can be trained using positive images that have a specific hazard and negative images that do not have the specific hazard. The trained binary image classifier can be applied to each image of unlabeled image sets (e.g., unlabeled images), and determine that whether or not that image has the hazard. The images that have been determined to have the hazard are placed into the training dataset of the computer vision model as a positive training dataset, and the images that have been determined not to have the yard debris hazard are placed into the training dataset of the computer vision model as a negative training dataset. Additionally and/or alternatively, an inspector can manually go through the outputs of the binary image classifier and validate the results, and add the validated images into the training dataset for the computer vision model. Importantly, the processes discussed in FIG. 7 greatly improve the speed and efficiency with which the computer vision system can be trained to recognize hazards, as the semi-supervised learning approach helps to find the training data available from a large pool of training images without manually going through all of them.

Figure 8:
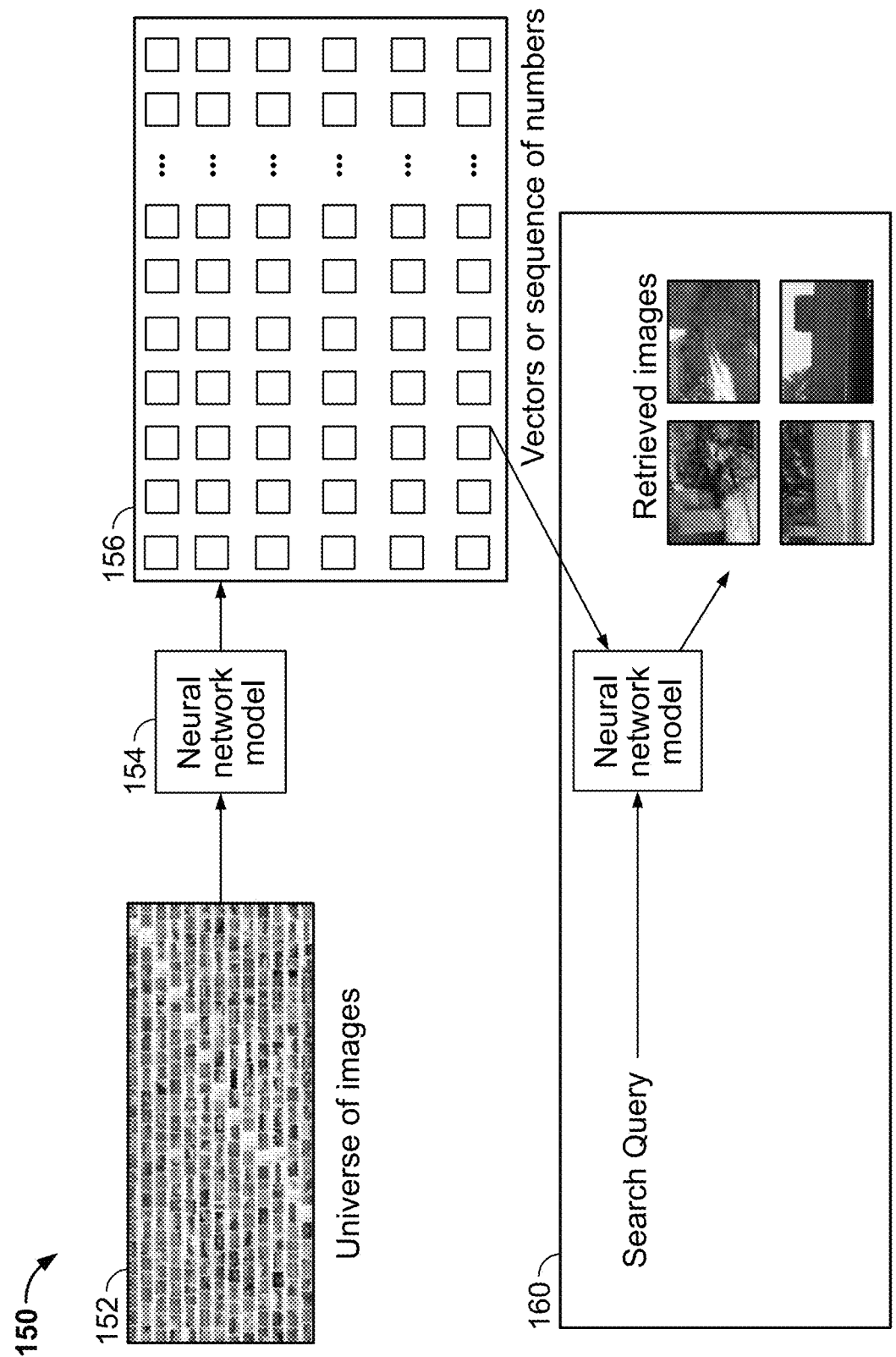
FIG. 8 is a diagram illustrating another example training dataset generated by the system of the present disclosure.

FIG. 8 is a diagram illustrating another example of training dataset generation (indicated at 150) performed by the system of the present disclosure. A neural network model (such as the CLIP model discussed above, or other suitable neural network model) can be used to select images having a specific hazard based on natural language descriptors for the specific hazard (e.g., one or more search queries, or the like). For example, images 152 in a database are processed through the neural network model 154 that generates vectors (or sequence of numbers) 156. As shown in the diagram 160, a search query indicative of a particular hazard is input into the neural network model. The search query can include one or more words and/or phrases to indicate the hazard in a form of text or a verbal command. The neural network model can generate a similarity coefficient against each image of the database and find a group of images that have higher similarity associated with the specific hazard compared with other images in the database. Examples are further described in FIG. 9.

Figure 9:
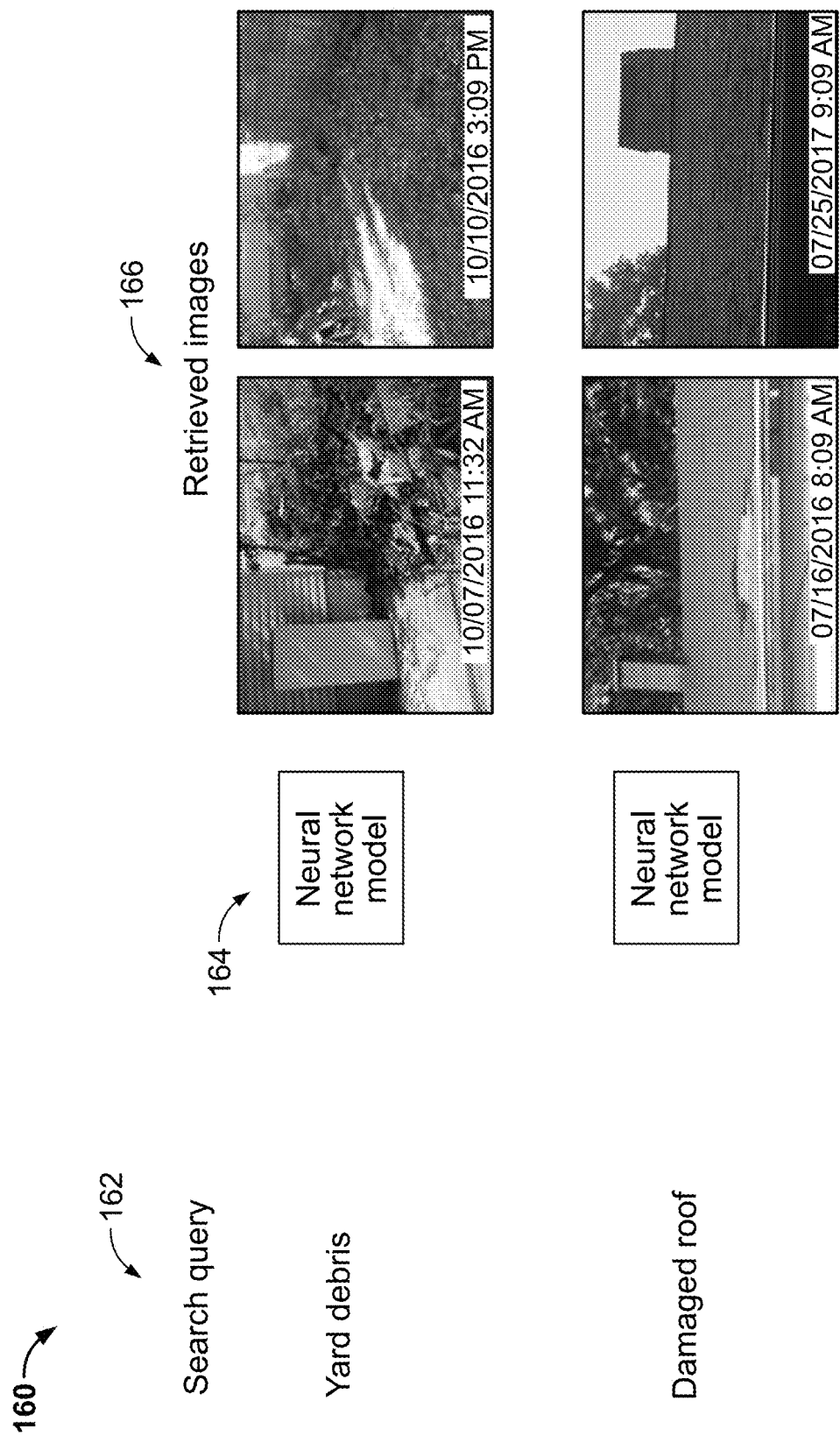
FIG. 9 is a diagram illustrating an example of the training dataset illustrated in FIG. 8.

FIG. 9 is a diagram illustrating the example training dataset illustrated in FIG. 8. A user inputs a search query 162 that includes text indicative of a hazard (e.g., yard debris, or damaged roof) into the neural network model 164. The neural network model 164 can retrieve one or more images 166 associated with the yard debris hazard, or one or more images 166 associated with the damaged roof hazard.

Figure 10:
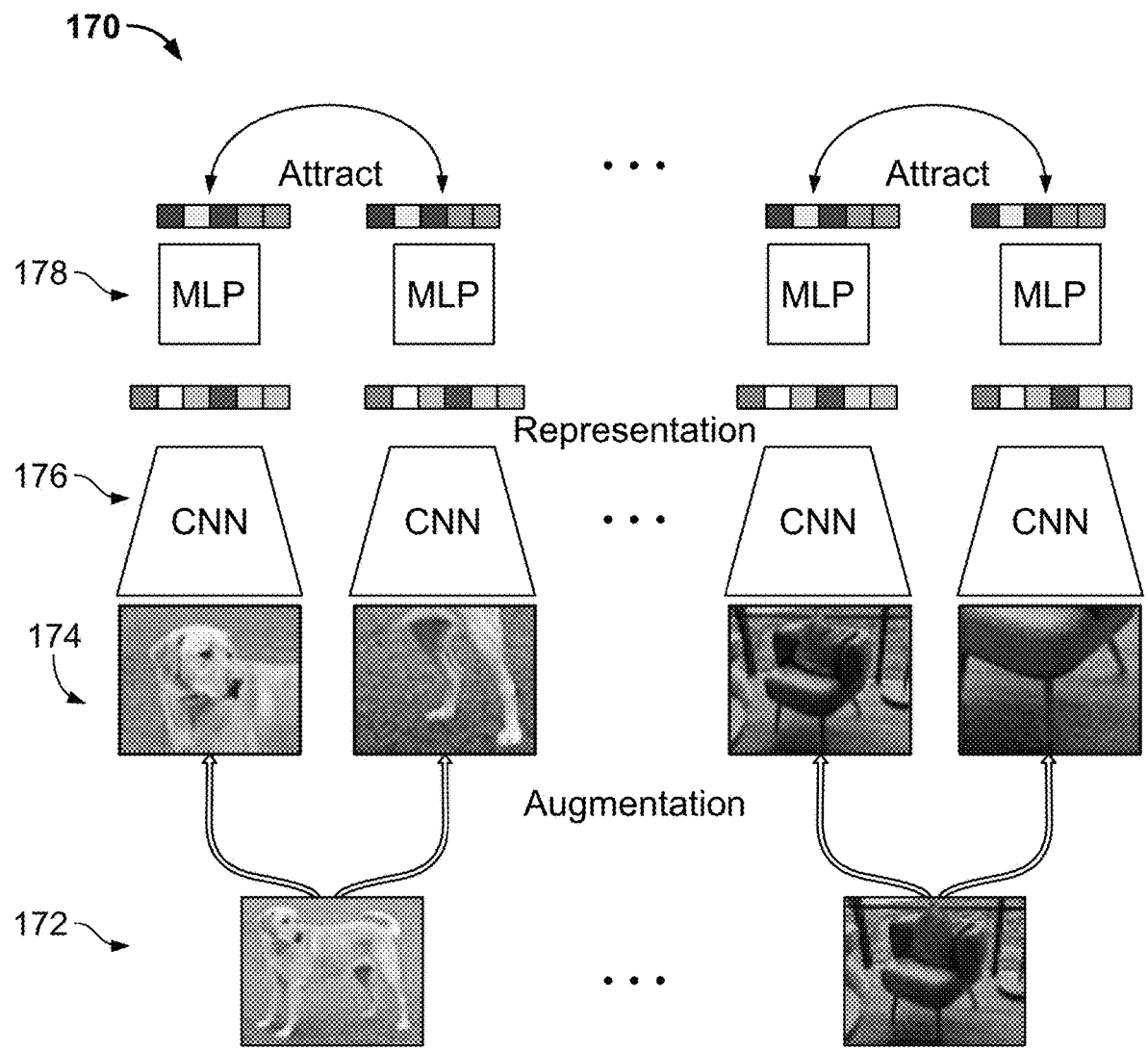
FIG. 10 is a diagram illustrating another example training dataset generated by the system of the present disclosure.

FIG. 10 is a diagram illustrating another example of a training dataset generated by the system of the present disclosure and indicated generally at 170. A contrastive learning model (e.g., SimCLR model or other suitable contrastive learning model) can be used to generate images having a specific hazard by augmenting given images and outputting new images. For example, the contrastive learning model randomly draws examples 172 from an original dataset, transforming each example twice using a combination of simple augmentations (random cropping, random color distortion, and Gaussian blur), creating two sets of corresponding views 174. The contrastive learning model then computes an image representation using a convolutional neural network based architecture 178 (e.g., ResNet architecture) for each set. Afterwards, the contrastive learning model computes a non-linear projection of the image representation using a fully-connected network 178 (e.g., multilayer perceptron MLP), which amplifies the invariant features and maximizes the ability of the network to identify different transformations of the same image. Accordingly, the contrastive learning model can yield projections that are similar for augmented versions of the same image, while being dissimilar for different images, even if those images are of the same class of object. The generated images for the specific hazard can be used as training dataset for the computer vision model.

Figure 11:
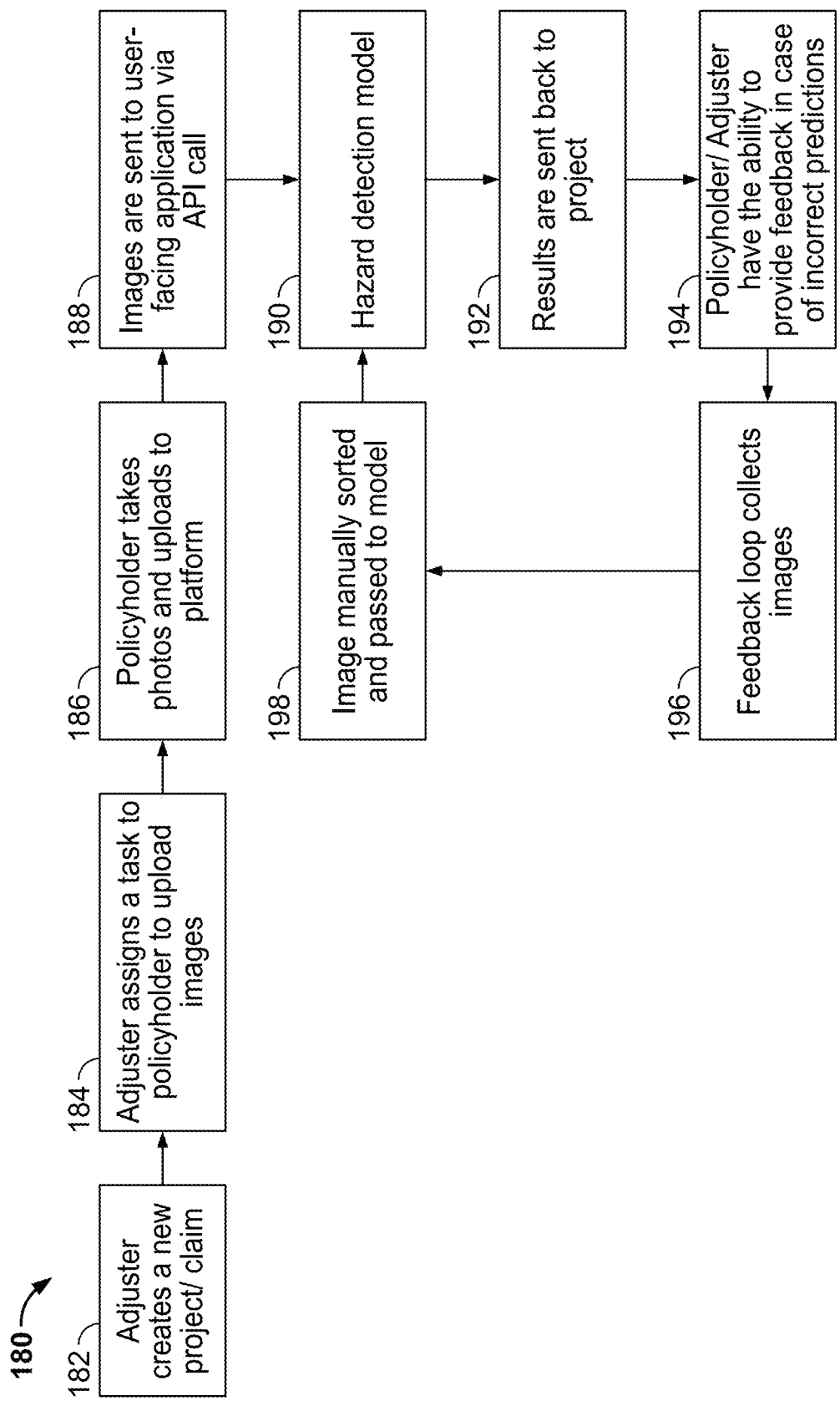
FIG. 11 is flowchart illustrating additional processing steps carried out by the system of the present disclosure.

FIG. 11 is a diagram illustrating additional processing steps 180 carried out by the system of the present disclosure. Beginning in step 182, an adjuster creates a new project/claim. In step 184, the adjuster assigns a task to a policyholder to upload images. In step 186, the policyholder takes photos of a property and uploads to the system 10. In step 188, images are sent to the system 10 via an API call. It can be understood that the model can also be deployed on the policy holder's phone and be used to make predictions. In step 190, the images are input into a hazard detection model (e.g., the computer vision model described in FIGS. 1-10). In step 192, the results of the hazard detection model are sent back to the policyholder and/or adjuster. In step 194, the policyholder and/or adjuster provides feedback to the system 10 in case of incorrect predictions provided by the system 10. In step 196, a feedback loop of the system 10 collects the images associated with the feedback. In step 198, the images are manually sorted and passed to the hazard detection model to retrain the hazard detection model for more accurate prediction.

Figure 12:
FIG. 12 is a diagram illustrating an example of a user interface of the system presented herein.
Figure 12:
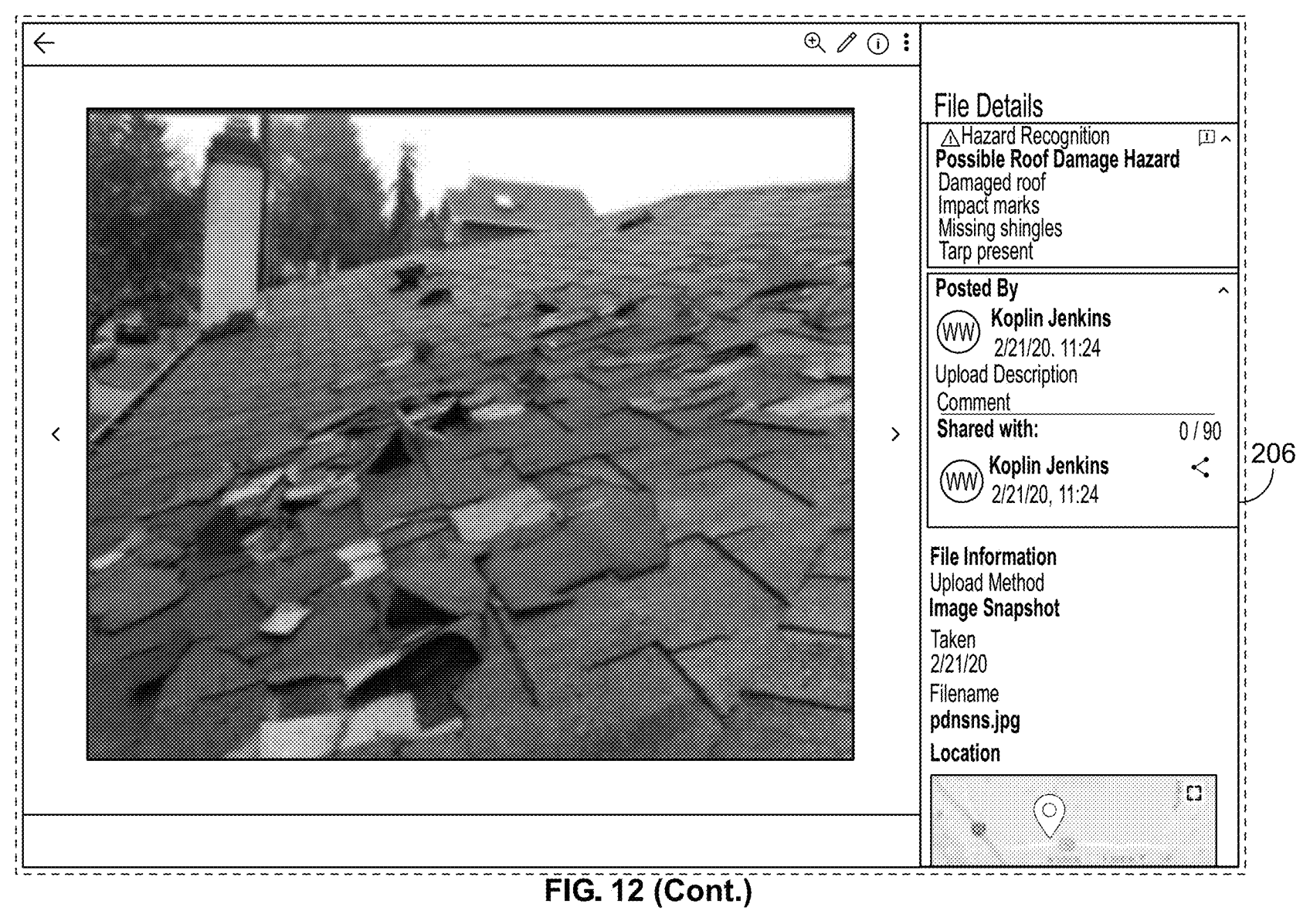

FIG. 12 is a diagram illustrating an example of a user interface 200 generated by the system of the present disclosure. A first user interface 202 of the system 10 presents an image of a property, detected hazards in the image, and posts information. Compared with the first user interface 202, a second user interface 204 further presents a pop-out window to obtain feedback and/or an input from a user, and a third interface 206 further presents a location of the property having the detected hazards.

Figure 13:
FIG. 13 is a diagram illustrating additional examples of hazard detection performed by the system of the present disclosure.

FIG. 13 is a diagram 210 illustrating hazard detection carried out by the system of the present disclosure. The system 10 can detect hazards in a photo 212 using heatmap 214 that emphasizes areas where the computer vision model determines that the hazard is present (and uses different colors to indicate where the hazard is likely located, e.g., red to indicate very high probability, and blue or violet to indicate probability). The system 10 can further localizes hazard in the photo 212 using a boundary box 216 for further processing. It can also be understood that the system can also identify the intensity of the hazard. For example, an image can have "roof hazard" which is "low risk" whereas another image might contain "roof hazard" which is "high risk".

Figure 14:
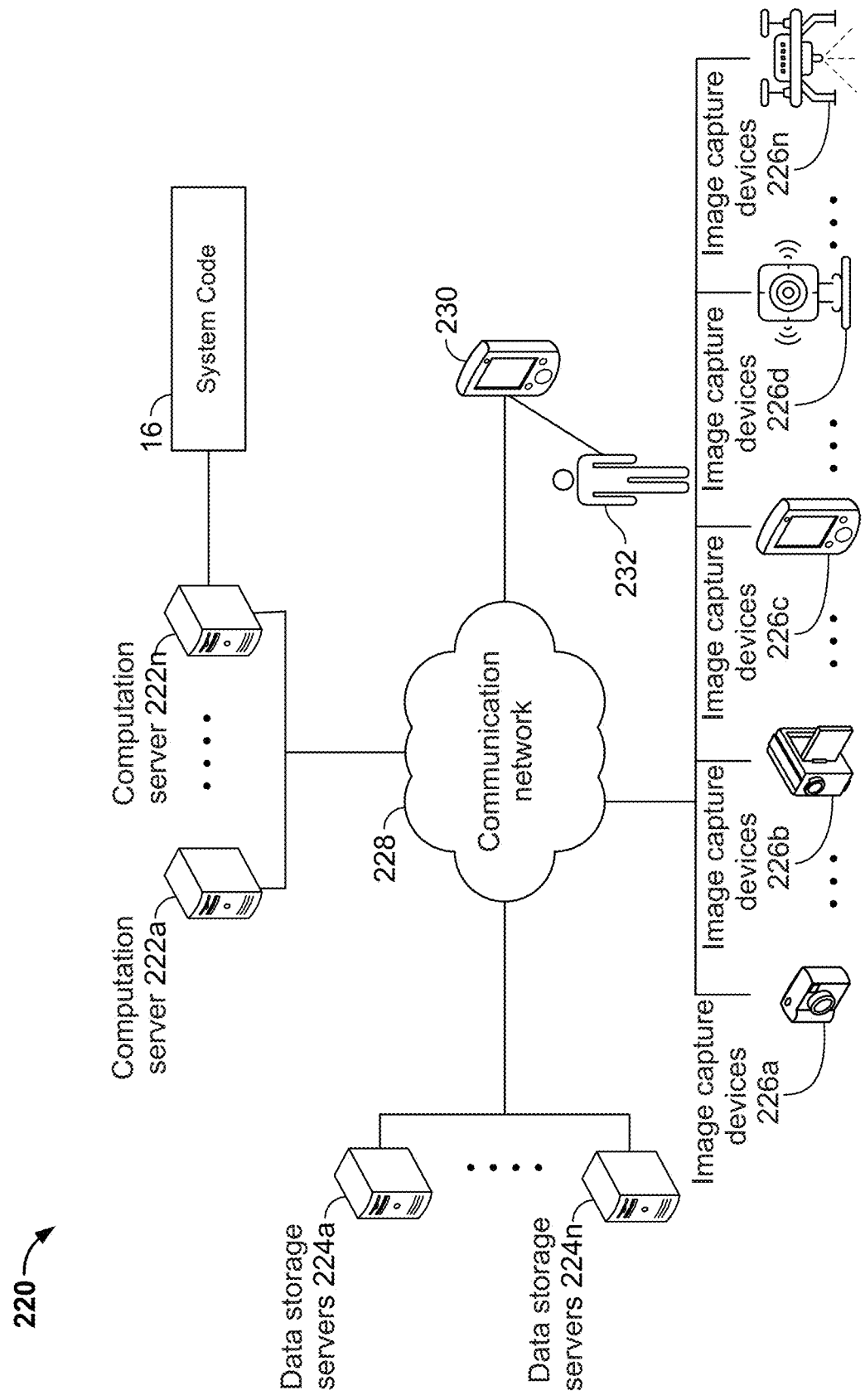
FIG. 14 is a diagram illustrating hardware and software components capable of being utilized to implement the system of the present disclosure.

FIG. 14 is a diagram illustrating hardware and software components capable of being utilized to implement a system 220 of the present disclosure. The system 220 can include a plurality of computation servers 222a-222n having at least one processor and memory for executing the computer instructions and methods described above (which can be embodied as system code 16). The system 220 can also include a plurality of data storage servers 224a-224n for receiving image data and/or video data. The system 220 can also include a plurality of image capture devices 226a-226n for capturing image data and/or video data. For example, the image capture devices can include, but are not limited to, a digital camera 226a, a digital video camera 226b, a use device having cameras 226c, a LiDAR sensor 226d, and a UAV 226n. A user device 230 can include, but it not limited to, a laptop, a smart telephone, and a tablet to capture an image of an asset, display an identification of a structural item and a corresponding material type to a user 232, and/or to provide feedback for fine-tuning the models. The computation servers 222a-222n, the data storage servers 224a-224n, the image capture devices 226a-226n, and the user device 230 can communicate over a communication network 228. Of course, the system 220 need not be implemented on multiple devices, and indeed, the system 220 can be implemented on a single (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A computer vision system for hazard detection from digital media content, comprising:
   a database storing digital media content indicative of an asset; and
   a processor in communication with the database, the processor:
   obtaining the digital media content from the database;
   extracting at least one feature corresponding to the asset from the digital media content;
   determining a value associated with a hazard based at least in part on one or more classifiers;
   determining whether the hazard is present in the digital media content based at least in part on a comparison of the value to one or more threshold values; and
   generating an indication indicative of the hazard,
   wherein the processor executes a computer vision model having a first plurality of layers and a second plurality of layers, the first plurality of layers comprising a plurality of trained convolution layers which extract the at least one feature corresponding to the asset, the second plurality of layers comprising a plurality of fully-connected layers which process outputs of the plurality of trained convolution layers to classify the hazard, and each of the plurality of fully-connected layers includes a plurality of nodes, each of the nodes representing a presence or absence of the hazard.

2. The system of claim 1, wherein the digital media content include one or more of a digital image, a digital video, a digital video frame, a ground image, an aerial image, a satellite image, a representation of the asset, a point cloud, or a light detection and ranging (LiDAR) file.

3. The system of claim 1, wherein the processor obtains the digital media content from an image capture device.

4. The system of claim 1, wherein the processor preprocesses the digital media content prior to extracting the at least one feature.

5. The system of claim 4, wherein preprocessing of the digital media content includes one or more of compressing the digital media content, changing the size of the digital media content, changing a resolution of the digital media content, adjusting display settings, changing a perspective in the digital media content, adding one or more filters to the digital media content, adding or removing noise, spatially cropping or flipping the digital media content, up-sampling the digital media content, or changing a data point density of the digital media content.

6. The system of claim 1, wherein the indication includes one or more of a textual description of the hazard, a name of the hazard, a location of the hazard, or a graphical description of the hazard.

7. The system of claim 1, wherein the processor generates a training dataset and trains a computer vision model using the training dataset.

8. A computer vision method for hazard detection from digital media content, comprising the steps of:
obtaining at a processor the digital media content indicative of an asset;
extracting by the processor at least one feature corresponding to the asset from the digital media content;
determining by the processor a value associated with a hazard based at least in part of one or more classifiers;
determining by the processor whether the hazard is present in the digital media content based at least in part on a comparison of the value to one or more threshold values; and
generating by the processor an indication indicative of the hazard,
wherein the processor executes a computer vision model having a first plurality of layers and a second plurality of layers, the first plurality of layers comprising a plurality of trained convolution layers which extract the at least one feature corresponding to the asset, the second plurality of layers comprising a plurality of fully-connected layers which process outputs of the plurality of trained convolution layers to classify the hazard, and each of the plurality of fully-connected layers includes a plurality of nodes, each of the nodes representing a presence or absence of the hazard.

9. The method of claim 8, wherein the digital media content include one or more of a digital image, a digital video, a digital video frame, a ground image, an aerial image, a satellite image, a representation of the asset, a point cloud, or a light detection and ranging (LiDAR) file.

10. The method of claim 8, further comprising obtaining the digital media content from an image capture device.

11. The method of claim 8, further comprising preprocessing the digital media content prior to extracting the at least one feature.

12. The method of claim 11, wherein preprocessing of the digital media content includes one or more of compressing the digital media content, changing the size of the digital media content, changing a resolution of the digital media content, adjusting display settings, changing a perspective in the digital media content, adding one or more filters to the digital media content, adding or removing noise, spatially cropping or flipping the digital media content, up-sampling the digital media content, or changing a data point density of the digital media content.

13. The method of claim 8, wherein the indication includes one or more of a textual description of the hazard, a name of the hazard, a location of the hazard, or a graphical description of the hazard.

14. The method of claim 8, further comprising generating by the processor a training dataset and training a computer vision model using the training dataset.

* * * * *